(12) United States Patent
Strutz et al.

(10) Patent No.: US 10,974,691 B2
(45) Date of Patent: Apr. 13, 2021

(54) SELF-LOCKING BELT RETRACTOR FOR A SEAT BELT DEVICE OF A MOTOR VEHICLE

(71) Applicant: AUTOLIV DEVELOPMENT AB, Vargarda (SE)

(72) Inventors: Michael Strutz, Neuendorf (DE); Stefan Suhr, Elmshorn (DE); Christopher Werner, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 86 days.

(21) Appl. No.: 16/360,222

(22) Filed: Mar. 21, 2019

(65) Prior Publication Data

US 2019/0291687 A1 Sep. 26, 2019

(30) Foreign Application Priority Data

Mar. 21, 2018 (DE) .......................... 10 2018 106 664

(51) Int. Cl.
*B60R 22/46* (2006.01)
(52) U.S. Cl.
CPC .................................. *B60R 22/46* (2013.01)
(58) Field of Classification Search
CPC ......... B60R 22/26; B60R 22/34; B60R 22/46; B60R 22/3413
See application file for complete search history.

(56) References Cited

U.S. PATENT DOCUMENTS

| | | | |
|---|---|---|---|
| 6,364,238 B1 | 4/2002 | Weller | |
| 7,946,519 B2* | 5/2011 | Gray | B60R 22/4676 242/374 |
| 9,038,935 B2 | 5/2015 | Stroik, Jr. | |
| 2012/0006928 A1* | 1/2012 | Ono | B60R 22/4676 242/374 |
| 2017/0259779 A1* | 9/2017 | Sasahara | B60R 22/4676 |

FOREIGN PATENT DOCUMENTS

| | | |
|---|---|---|
| DE | 299 09 252 U1 | 11/1999 |
| DE | 10 2012 102 093 A1 | 9/2012 |
| EP | 2 409 882 A1 | 1/2012 |
| JP | 5557367 B2 | 7/2014 |

\* cited by examiner

*Primary Examiner* — Sang K Kim
(74) *Attorney, Agent, or Firm* — Dickinson Wright PLLC

(57) ABSTRACT

A self-locking belt retractor for a seat belt device of a motor vehicle with a belt shaft body and a profile head, and a blocking device with a blocking catch mounted on the profile head. When activated, the blocking device engages in a blocked position with a vehicle-affixed interlock for the purpose of blocking the belt shaft in the belt extension direction. A force-limiting device is disposed in the force transmission path from the belt shaft body to the blocking catch. The profile head is made as two parts, with a carrier component and an insert component which are affixed together. The insert component exhibits a higher resistance to deformation than the carrier component and, when the belt shaft is blocked, forms part of the force transmission path between the blocking catch and the force-limiting device.

14 Claims, 3 Drawing Sheets

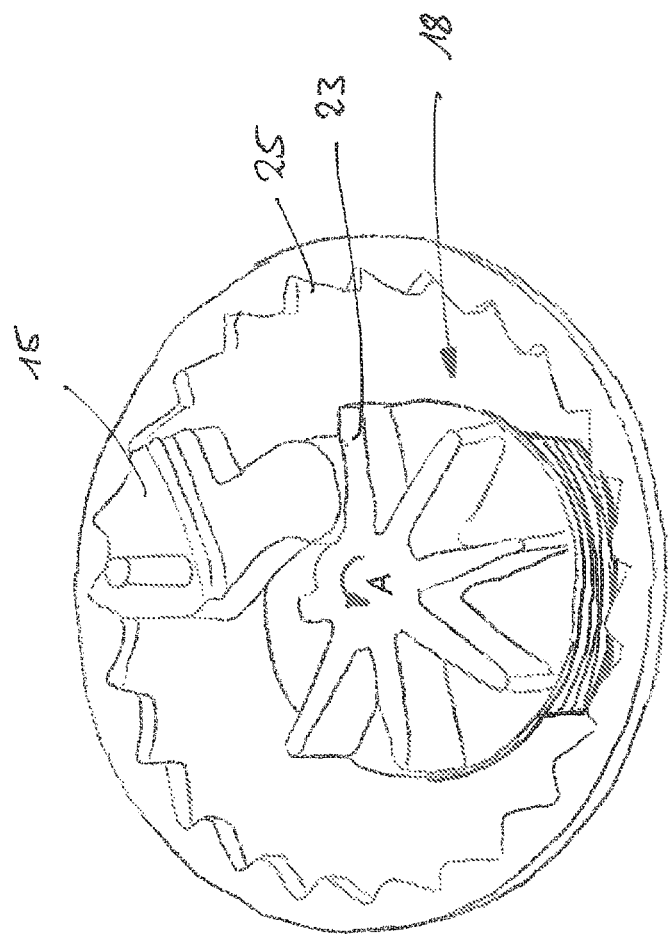

SELF-LOCKING BELT RETRACTOR FOR A SEAT BELT DEVICE OF A MOTOR VEHICLE

CROSS-REFERENCE TO RELATED APPLICATION

This application claims the benefit of priority under 35 U.S.C. § 119 to German Patent Application No. 10 2018 106 664.3, filed Mar. 21, 2018, the contents of which are incorporated herein by reference in their entirety.

FIELD OF THE INVENTION

The invention relates to a self-locking belt retractor for a seat belt device of a motor vehicle.

BACKGROUND AND INTRODUCTORY DESCRIPTION OF THE INVENTION

Seat belt devices in motor vehicles serve to restrain a passenger in the event of an accident, to reduce serious injuries. The seat belt devices thereby include a seat belt, which is affixed to the vehicle at one end with an end fitting and affixed at the other end to a belt shaft of a belt retractor, which is affixed to the vehicle. Furthermore, a movable belt tongue is provided on the seat belt, which can be locked into a belt buckle, which is also affixed to the vehicle, in order to create a 3-point geometry.

The belt retractor can be blocked by a blocking device which is controlled by use of a vehicle-sensitive and/or belt-sensitive sensor device in the event of an accident where a predetermined acceleration value of the belt extension speed or predetermined deceleration value of the vehicle is exceeded, preventing further extension of the seat belt, and thus restraining the vehicle occupant. The blocking device includes a blocking catch, which can be engaged by the sensor device to interlock with the belt retractor in a vehicle-affixed manner. Furthermore, it is a known technique to provide one or more parallel or serial force-limiting devices in the belt retractor, which, when the belt shaft is blocked, allow for additional force-limited extension of the seat belt according to a predetermined force-limiting characteristic and thereby reduce the strain on the occupant during restraint.

To this end, the profile head is designed in two pieces and includes a carrier component, on which the blocking catch is mounted, and an insert component. The force-limiting devices are then disposed between the profile head insert component and the belt shaft body and are activated by the blocking of the profile head by use of the blocking catch and a subsequent exceedance of the belt extension force as defined by the force-limiting devices.

A proven embodiment of a force-limiting device is a torsion bar, which passes through a cavity of the belt shaft body and is non-rotatably fixed at one end to the belt shaft body and non-rotatably fixed at the other end with the profile head. For this force-limiting device, the force-limiting level is defined by the plastic deformation limit of the torsion bar for torque acting upon the longitudinal axis of the torsion bar. A belt retractor such as this is known from EP 2 409 882 A1, for example.

Furthermore, it is known from JP 5557367 B2 to provide a second force-limiting device acting in parallel with the torsion bar in the belt retractor.

The profile head carrier component can be used for the mounting of the belt shaft and exhibits a complex shape for guiding and mounting of the blocking catch. Furthermore, the blocking catch is supported on the profile head carrier component in its blocked position, and the profile head insert component must exhibit sufficient strength to absorb the reaction forces exerted upon it, so that it does not deform under load, or even break under extreme circumstances. In contrast, there is a fundamental effort to be able to produce the profile head as cost-effectively as possible as a mass-production part. With this background, the profile head carrier component is produced as a cast or sintered part out of a metal, preferably out of ZAMAK.

With this background, the objective of embodiments of the present invention is to produce a self-locking belt retractor for a seat belt device of a motor vehicle with a two-part profile head, which is cost-effective to produce and can be improved in terms of the requirements described at the outset.

The above described objective is met in accordance with the invention by a self-locking belt retractor with the described herein. Preferred embodiments of the invention are to be derived from the, the figures, and the associated descriptions.

According to a feature of embodiments of the invention, it is recommended that the profile head is made as two parts, with a carrier component and an insert component which is non-rotatably affixed to the carrier component, wherein the insert component exhibits a higher resistance to deformation than the carrier component and, when the belt shaft is blocked, forms a connection between the blocking catch and the force-limiting device.

With the recommended solution, the belt retractor can be designed better with respect to the requirements, in that the profile head is designed as two components, wherein the carrier component is specially designed with consideration of the mounting and guiding of the blocking catch, while the insert component is specially designed for receiving and transmitting the reaction forces. The functions of mounting and guiding the blocking catch are thereby practically separated from the function of force transmission. To this end, the insert component specially exhibits a higher deformation resistance than the carrier component and, in the blocked state of the blocking catch, forms the force transfer connection between the blocking catch and the force-limiting device. The force exerted by the belt shaft body is introduced via the insert component with bridging of the carrier component directly through the blocking catch into the vehicle-affixed interlock. The carrier component of the profile head can thereby be optimized with respect to the choice of material, the manufacturing process, and especially with respect to the forming process and the associated costs, without taking into account the reaction forces which must be absorbed. The assembly of the two-component profile head and the insert component thus constitutes a hybrid, which with respect to the requirements can be designed better.

It is further recommended that the blocking catch is mounted on the carrier component in a swivel plane such that it can swivel, and the insert component protrudes into the swivel plane. The swivel plane is defined by the swiveling motion performed by the blocking catch from its non-blocked position into its blocked position and meshing with the vehicle-affixed interlock, which is also disposed in the swivel plane. The swivel plane is favorably located perpendicular to the rotational axis of the belt shaft. With the recommended disposition of the insert component, the blocking catch is thus supported in a plane on the vehicle-affixed interlock as well as on the insert component. The reaction forces absorbed by the insert component thus work in the same plane as the blocking forces working between the blocking catch and the vehicle-affixed interlock. Put another way, the blocking force emanating from the vehicle-affixed interlock is conducted via the blocking catch into the insert component without any diversion.

It is further recommended that the insert component exhibits a fixing section, and the carrier component exhibits a second recess which corresponds in shape to the shape of the fixing section and with which the insert component with the fixing section engages to form a positive-locking connection. With the recommended solution, the insert component and the profile head form a non-rotatable connection until activation of the force-limiting device. If the insert component is also non-rotatably connected to the belt shaft body, it also serves to provide a non-rotatable connection of the profile head with the belt shaft body up to the force-limiting level defined by the force-limiting device. As the insert component in the area of the fixing section is intentionally designed and disposed to absorb the reaction forces, the blocking of the belt shaft takes place reliably and without placing load on the carrier component of the profile head.

In this case, the fixing section and the second recess can preferably be designed in a star shape. With the recommended solution, a very solid, direction-neutral, and large-surface connection of the insert component with the carrier component can be achieved.

It is further recommended that the blocking catch is mounted in a first recess of the carrier component, and that the first recess exhibits an opening through which the blocking catch abuts the insert component. The first recess exhibits a special contour, through which the movement of the blocking catch is, inter alia, guided into the blocked position. To this end, the blocking catch must necessarily rest on one or more walls of the first recess in its various positions, so that no uncontrolled or undesired movements can occur. According to the invention, at least one wall of the first recess, which is very important for guiding the blocking catch, is now interrupted by an opening, so that the blocking catch with bridging of the carrier component can preferably rest or come to rest directly on the insert component.

It is further recommended that the activation of the force-limiting device is limited by a stop, whereby a progressive force-limiting characteristic or also stop characteristic (LLS) can be achieved.

It is further recommended that the insert component exhibits a thread which is coaxial to a rotational axis of the belt shaft body in its assembled state, with which it is screwed together with a correspondingly shaped thread of the belt shaft body for the purpose of enabling relative rotational movement. Through this threaded connection, an axial connection of the insert component with the belt shaft body is achieved. Additionally, with an appropriate choice of thread direction it is possible that the belt shaft body performs a predetermined relative rotational movement and thereby a forced axial movement in relation to the insert component when the force-limiting device is active.

In this case, the stop can thus preferably be disposed such that it limits the relative rotational movement enabled by the thread. This can be achieved, for example, in that the thread pair is pulled flush, or that a stop is provided on one of the threads to block further rotational movement. Thus the load limiting element (torsion bar) is not capable of further torsional deformation and the load on the associated seat belt can increase beyond the set load limiting threshold.

It is further recommended that the insert component is designed as a steel component, which can preferably be produced by cold forming. Due to the very high durability of steel and especially due to the much higher durability compared to sintered parts and especially compared to ZAMAK, the insert component can thus absorb significantly more force than the carrier component, which in turn can be produced very cost-effectively as a sintered part with a very complex shape. Furthermore, the thread on the insert component can thus be formed during the production process of the insert component, without the need for additional post-processing.

It is further recommended that the insert component is pressed over protruding projections in correspondingly shaped openings of the carrier component. The insert component and the carrier component thus form a connection and can be regarded as a two-part profile head as an assembly which is fixed against rotation up to a certain force.

BRIEF DESCRIPTION OF THE DRAWINGS

Embodiments of the invention will subsequently be explained using preferred embodiments and with reference to the accompanying figures. Shown here:

FIG. 3 shows a blocking catch in a blocked position, resting on the fixing section of the insert component.

DETAILED DESCRIPTION

Figure 1:
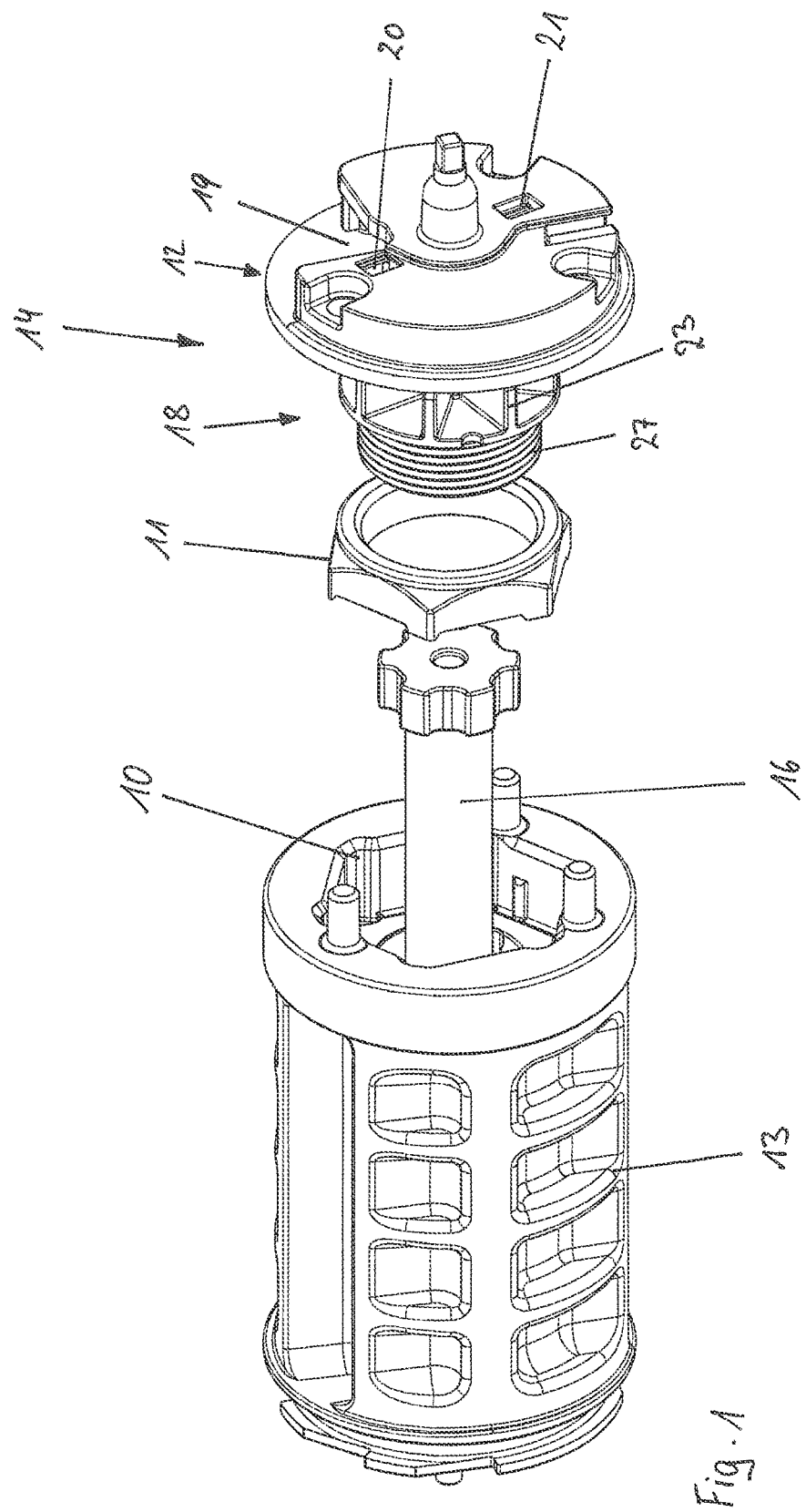
FIG. 1 shows a self-locking belt retractor according to an embodiment of the invention with a torsion bar in a first view in exploded view.
Figure 2:
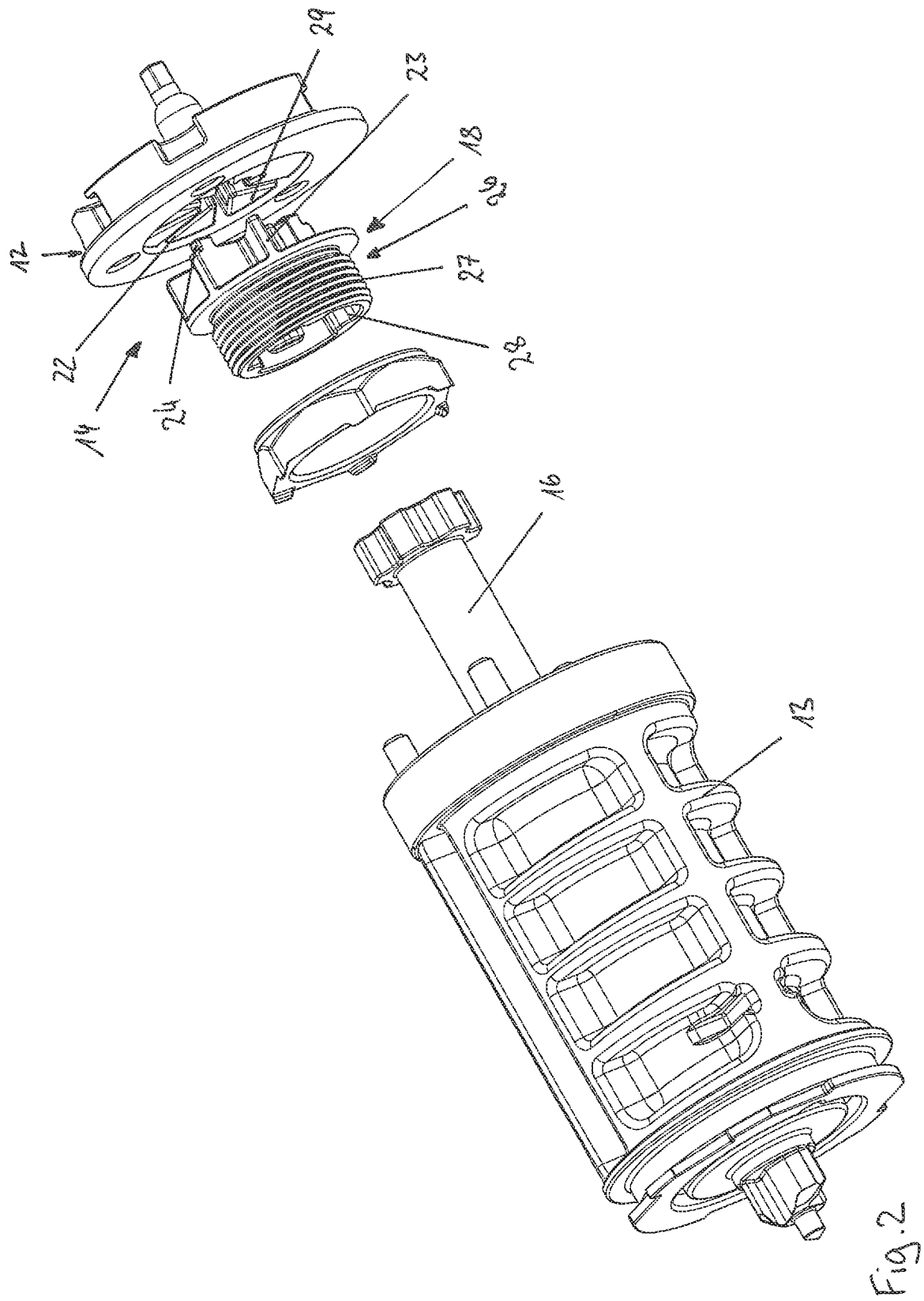
FIG. 2 shows a self-locking belt retractor according to an embodiment of the invention with a torsion bar in a second view in exploded view.

In FIGS. 1 and 2 respectively, a self-locking belt retractor according to the invention can be seen in various views in exploded view. The belt retractor includes a U-shaped frame (not shown) with two opposing legs, in each of which an opening is provided. The belt retractor is affixed to the vehicle via the frame, either onto the vehicle structure or on a vehicle seat. Furthermore, the belt retractor includes a belt shaft body 13, a profile head 14, and a torsion bar 16, which is mounted in the openings of the legs of the frame. The belt shaft body 13 serves to wind up a seat belt, while a first recess 19 is provided on the profile head 14, in which a blocking catch, only seen in FIG. 3, is mounted such that it can swivel. The torsion bar 16 is non-rotatably connected on a first end with the belt shaft body 13 and on a second end with the profile head 14 and forms a force-limiting device which will be subsequently described in greater detail.

The blocking catch 15 is part of a blocking device and is actuated by a vehicle-sensitive and/or belt-sensitive sensor device (not shown), whereby it is forced to swivel into a vehicle-affixed interlock 25, seen in part in FIG. 3, of an opening of the frame, whereby the belt shaft in turn is blocked against further extension of the seat belt. Subsequently the seat belt can only be extended if the seat belt extension force, defined by the plastic deformation limit of the torsion bar 16, is exceeded, and the torsion bar 16 enables a relative rotational motion of the belt shaft body 13 against the blocked profile head 14 by use of plastic deformation along its longitudinal axis. Thus far, the belt retractor corresponds to the prior art.

According to the invention, a further-developed two-part profile head 14 with a carrier component 12 and an insert component 18 is provided in the belt retractor. The first recess 19 is provided here on the carrier component 12 and is formed by one or more walls with a defined shape. The blocking catch 15 rests in the first recess 19 and is guided in its motion into the vehicle-affixed interlock 25 during its retraction movement, inter alia, by the shape of the first recess 19. Thus, the shape of the first recess 19 is of special importance for the functionality of the belt retractor and especially for the functionality of the blocking device, and is subject to very high requirements in terms of dimensional accuracy. Furthermore, the carrier component 12 forms a second, star-shaped recess 22 on its underside, which is limited by circumferentially spaced circular segment sections 29 of the carrier component 12.

The insert component 18 performs a correspondingly star-shaped fixing section 23 with radially-protruding serrations or radiances, which exhibit an identical shape to the second recess 22 in the carrier component 12. Furthermore, the insert component 18 features a cylindrical extension 26 with a coaxial thread 27 disposed thereon.

The fixing section 23 of the insert component 18 and the second star-shaped recess 22 of the carrier component 12 are dimensioned such that the fixing section 23, in the position in which it is inserted into the second recess 22, extends into the swivel plane of the blocking catch 15, as can be seen in the sectional depiction of FIG. 3. The first recess 19 on the carrier component 12 forms a lateral opening 17 which is disposed in the swivel plane of the blocking catch 15, through which the blocking catch 15 rests immediately laterally on the fixing section 23 of the insert component 18, or comes to rest there in its blocked position. In the event that the insert component 18 is non-rotatably connected to the belt shaft body 13, and the blocking catch 15 is blocked in the vehicle-affixed interlock 25, the blocking catch 15 with bridging of the carrier component 12 is supported on the fixing section 23 of the insert component 18, and thereby opposite the belt shaft body 13. The insert component 18 thus forms the force connection of the blocking catch 15 via the torsion bar 16 to the belt shaft body 13.

The insert component 18 is designed here as a steel component with very high deformation resistance, while the carrier component 12 is designed as a sintered, cast, or injection molded part made of a cost-effective material with a lower deformation resistance than the insert component 18. In this case, materials such as ZAMAK or a dimensionally stable plastic can be considered.

Two axially protruding projections 24 are provided on the insert component 18, which during assembly are caulked in correspondingly shaped and identically disposed openings 20 and 21 of the carrier component 12 for a press-fit or by subsequent cold forming of the parts after assembly. Thus, the carrier component 12 subsequently forms a solid connection with the insert component 18 and can also be referred to as a two-part profile head 14.

The insert component 18 exhibits a concentric profile opening 28 disposed in the cylindrical extension 26, in which the second end of the torsion bar 16 is non-rotatably fixed. With the other, first end, the torsion bar 16 is non-rotatably fixed in a known manner in a profile opening (not shown) of the belt shaft body 13. The insert component 18 is disposed with the fixing section 23 concentric to the belt shaft body 13, so that the belt shaft body 13 rotates concentrically to the insert component 18 during the force-limited belt extension movement.

An additional profile opening 10 is provided in the belt shaft body 13, in which a threaded insert 11 is non-rotatably fixed with an internal thread. The insert component 18 is intentionally not screwed fully into the internal thread of the threaded insert 11, that is, only by a few rotations.

This results in a progressive force-limiting characteristic or stop characteristic according to the following principle. First, the two-part profile head 14 is blocked by the entry of the blocking catch 15 into the vehicle-affixed interlock 25. If the belt extension force exceeds the force-limiting level defined by the force-limiting device, that is, the torsion bar 16, then the torsion bar 16 is plastically twisted around its longitudinal axis, in that the end of the torsion bar 16 which is connected with the insert component 18, that is, with the profile head 14, is blocked by the activation of the blocking device, while the other end of the torsion bar 16 which is connected with the belt shaft body 12 turns in the direction of belt extension. Thus, the insert component 18 and the carrier component 12 form a solid connection, and the insert component 18 is supported with the fixing section 23 via the blocking catch 15 on the vehicle-affixed interlock 25, as is seen in FIG. 3. At the same time, the belt shaft body 13 rotates opposite the insert component 18, whereby the belt shaft body 13 with the threaded insert 11 is screwed onto the thread 27 of the insert component 18. The belt shaft body 13 is thereby pulled in the direction of the insert component 18. This relative rotational movement is possible until the belt shaft body 13 or rather the threaded insert 11 comes into contact with the front face of the insert component 18 or the belt shaft body 13 and is thereby pulled flush. The front face of the insert component 18, belt shaft body 13, or also the threaded insert 11 thus form a stop to limit the rotational movement of the belt shaft body 13 opposite the insert component 18. After the stop is reached, the force-limiting device is deactivated due to the blocked relative rotational motion, the torsion bar 16 is practically bridged and cannot be plastically deformed anymore. As a result of the relative rotational motion being blocked in this manner, the belt extension force and the restraining force on the passenger abruptly increase further to a progressive force limiting characteristic or LLS force limiting characteristic.

The insert component 18 is intentionally made of a material with a higher strength than the carrier component 12 and serves to transfer force, while the carrier component 12 is preferably made of a material in a manufacturing process which allows for cost-effective production, such as a plastic injection molded or sintered part. Furthermore, due to the two-part nature of the profile head 14, undercuts and the associated complex tool design can be avoided, whereby the production costs can be further reduced.

Additionally, the carrier component 12 can be produced from a material with more favorable bearing and sliding properties, without the need to account for the force transmission during the blocking process and especially during the activation of the force-limiting device. As a result, the fixing of the belt shaft can be improved on this side.

While the above description constitutes the preferred embodiment of the present invention, it will be appreciated that the invention is susceptible to modification, variation and change without departing from the proper scope and fair meaning of the accompanying claims.

The invention claimed is:

1. A self-locking belt retractor for a seat belt device of a motor vehicle comprising, a belt shaft body and a profile head, and a blocking device with a blocking catch mounted on the profile head, which when in an activated condition engages in a blocked position with a vehicle-affixed interlock for the purpose of blocking the belt shaft body in a belt extension direction, and a force-limiting device disposed in a force transmission path from the belt shaft body to the blocking catch, the profile head is formed of two parts, with a carrier component and an insert component that is non-rotatably connected with the carrier component, the insert component is further non-rotatably fixed to a portion of the force-limiting device, and exhibits a higher deformation resistance than the carrier component and forms a part of the force transmission path when the belt shaft body is blocked.

2. A self-locking belt retractor according to claim 1 further comprising, the blocking catch is mounted on the carrier component in a swivel plane such that it can swivel, and the insert component protrudes into the swivel plane.

3. A self-locking belt retractor according to claim 1 further comprising, the activation of the force-limiting device is limited by a stop.

4. A self-locking belt retractor according to claim 1 further comprising, the insert component forms a thread which is coaxial to a rotational axis of the belt shaft body and is screwed together with a correspondingly shaped thread of the belt shaft body for the purpose of enabling a relative rotational movement and which, upon a predetermined relative rotation of the belt shaft body with respect to the insert component, reaches a stop preventing further of the relative rotation.

5. A self-locking belt retractor according to claim 4 further comprising the stop limits the relative rotational motion allowed by the thread.

6. A self-locking belt retractor according to claim 1 further comprising, the insert component is formed of steel.

7. A self-locking belt retractor according to claim 1 further comprising, the insert component is pressed via protruding projections in correspondingly shaped openings of the carrier component to connect together the insert component and the carrier component.

8. A self-locking belt retractor according to claim 7 further comprising, the protruding projections are formed to interlock with the carrier component through the shaped openings.

9. A self-locking belt retractor according to claim 1 further comprising, the carrier component is formed of one of a diecast material, a cast material, or a sintered material.

10. A self-locking belt retractor for a seat belt device of a motor vehicle comprising, a belt shaft body and a profile head, and a blocking device with a blocking catch mounted on the profile head, which when in an activated condition engages in a blocked position with a vehicle-affixed interlock for the purpose of blocking the belt shaft body in a belt extension direction, and a force-limiting device disposed in a force transmission path from the belt shaft body to the blocking catch, the profile head is formed of two parts, with a carrier component and an insert component that is non-rotatably connected with the carrier component, the insert component exhibits a higher deformation resistance than the carrier component and forms a part of the force transmission path when the belt shaft body is blocked, the insert component forms a fixing section, and the carrier component forms a recess which corresponds in shape to the shape of the fixing section and with which the insert component with the fixing section engages to form a positive-locking connection.

11. A self-locking belt retractor according to claim 10 further comprising, the fixing section and the recess are both generally star-shaped.

12. A self-locking belt retractor for a seat belt device of a motor vehicle comprising, a belt shaft body and a profile head, and a blocking device with a blocking catch mounted on the profile head, which when in an activated condition engages in a blocked position with a vehicle-affixed interlock for the purpose of blocking the belt shaft body in a belt extension direction, and a force-limiting device disposed in a force transmission path from the belt shaft body to the blocking catch, the profile head is formed of two parts, with a carrier component and an insert component that is non-rotatably connected with the carrier component, the insert component exhibits a higher deformation resistance than the carrier component and forms a part of the force transmission path when the belt shaft body is blocked, the blocking catch is mounted in a recess of the carrier component, and the recess forms an opening through which the blocking catch abuts the insert component for engagement in the activated condition.

13. A self-locking belt retractor for a seat belt device of a motor vehicle comprising, a belt shaft body and a profile head, and a blocking device with a blocking catch mounted on the profile head, which when in an activated condition engages in a blocked position with a vehicle-affixed interlock for the purpose of blocking the belt shaft body in a belt extension direction, and a force-limiting device disposed in a force transmission path from the belt shaft body to the blocking catch, the profile head is formed of two parts, with a carrier component and an insert component that is non-rotatably connected with the carrier component, the insert component exhibits a higher deformation resistance than the carrier component and forms a part of the force transmission path when the belt shaft body is blocked, the blocking catch is mounted on the carrier component in a swivel plane such that it can swivel, and the insert component protrudes into the swivel plane, the swivel plane is perpendicular to a rotational axis of the belt shaft body.

14. A self-locking belt retractor for a seat belt device of a motor vehicle comprising, a belt shaft body and a profile head, and a blocking device with a blocking catch mounted on the profile head, which when in an activated condition engages in a blocked position with a vehicle-affixed interlock for the purpose of blocking the belt shaft body in a belt extension direction, and a force-limiting device disposed in a force transmission path from the belt shaft body to the blocking catch, the profile head is formed of two parts, with a carrier component and an insert component that is non-rotatably connected with the carrier component, the insert component exhibits a higher deformation resistance than the carrier component and forms a part of the force transmission path when the belt shaft body is blocked, the blocking catch is mounted on the carrier component in a swivel plane such that it can swivel, and the insert component protrudes into the swivel plane, the blocking catch and the carrier component are within the swivel plane.

* * * * *